(12) United States Patent
Uehara

(10) Patent No.: US 8,821,755 B2
(45) Date of Patent: Sep. 2, 2014

(54) LIQUID COMPOSITION CONTAINING LIQUID CRYSTAL POLYESTER

(75) Inventor: Tomoko Uehara, Osaka (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 13/425,475

(22) Filed: Mar. 21, 2012

(65) Prior Publication Data

US 2012/0248375 A1 Oct. 4, 2012

(30) Foreign Application Priority Data

Mar. 28, 2011 (JP) ................................ 2011-069253

(51) Int. Cl.
| | |
|---|---|
| *C09K 19/52* | (2006.01) |
| *C09K 19/06* | (2006.01) |
| *C09K 19/32* | (2006.01) |
| *C09K 19/00* | (2006.01) |
| *C08J 3/09* | (2006.01) |
| *C08G 69/44* | (2006.01) |
| *C09K 19/38* | (2006.01) |
| *C08L 77/12* | (2006.01) |

(52) U.S. Cl.
CPC ............. *C09K 19/3809* (2013.01); *C08J 3/096* (2013.01); *C08G 69/44* (2013.01); *C08L 77/12* (2013.01); *C08J 2367/00* (2013.01)

USPC ............. 252/299.01; 252/299.6; 252/299.62; 428/1.1

(58) Field of Classification Search
USPC ............... 252/299.01, 299.6, 299.62; 428/1.1
See application file for complete search history.

(56) References Cited

U.S. PATENT DOCUMENTS

| | | | |
|---|---|---|---|
| 7,022,807 B2 * | 4/2006 | Okamoto et al. ............. | 528/308 |
| 2004/0210032 A1 | 10/2004 | Okamoto et al. | |
| 2007/0092709 A1 | 4/2007 | Okamoto et al. | |
| 2012/0183697 A1 * | 7/2012 | Ito et al. ..................... | 427/385.5 |

FOREIGN PATENT DOCUMENTS

| | | |
|---|---|---|
| JP | 60-231775 A | 11/1985 |
| JP | 07-266499 A | 10/1995 |
| JP | 2004-315678 A | 11/2004 |
| JP | 2007-146139 A | 6/2007 |

* cited by examiner

*Primary Examiner* — Geraldina Visconti
(74) *Attorney, Agent, or Firm* — Panitch Schwarze Belisario & Nadel LLP

(57) ABSTRACT

A liquid composition containing a liquid crystal polyester, comprising (1) 15 to 40% by weight of a liquid crystal polyester, and (2) 60 to 85% by weight of a solvent containing N-methylpyrrolidone, wherein the liquid composition has a viscosity of 1.5 Pa·s or larger measured at 23° C., and the total of the liquid crystal polyester and the solvent is 100% by weight.

4 Claims, No Drawings

LIQUID COMPOSITION CONTAINING LIQUID CRYSTAL POLYESTER

BACKGROUND OF THE INVENTION

1. Field of the Invention

The present invention relates to a liquid crystal polyester-containing liquid composition, namely, a liquid composition which contains a liquid crystal polyester.

2. Description of the Related Art

Recently, various studies have been made on application of a liquid crystal polymer, especially a liquid crystal polyester, as a material constituting an insulating material (for example, an electronic substrate) because of having excellent high frequency characteristics and low hygroscopicity. It is possible to exemplify, as such an insulating material, a liquid crystal polyester-impregnated base material produced by a method in which a base material is impregnated with a liquid composition containing a liquid crystal polyester, which contains liquid crystal polyester and a solvent, and then the solvent is removed. In order to produce a liquid crystal polyester-impregnated base material having satisfactory quality, the liquid crystal polyester is desirably a liquid crystal polyester having satisfactory solubility in a solvent to be used.

For example, JP-A-2004-315678 (corresponding to CN101104705A and KR2004090717A) discloses that a liquid crystal polyester (aromatic liquid crystal polyester) including (1) a repeating unit derived from an aromatic hydroxycarboxylic acid, (2) a repeating unit derived from an aromatic dicarboxylic acid, and (3) a repeating unit derived from an aromatic amine selected from the group consisting of an aromatic diamine and an aromatic amine having a hydroxyl group is a liquid crystal polyester having satisfactory solubility in N-methylpyrrolidone. JP-A-2007-146139 (corresponding to CN1955253A and KR2007045095A) discloses that a liquid crystal polyester (aromatic liquid crystal polyester) with a limitation on a composition ratio of (1) a repeating unit derived from an aromatic hydroxycarboxylic acid, (2) a repeating unit derived from an aromatic dicarboxylic acid, and (3) a repeating unit derived from an aromatic amine selected from the group consisting of an aromatic diamine and an aromatic amine having a hydroxyl group, is a liquid crystal polyester which is soluble in N,N-dimethylacetamide as a solvent having a lower boiling point than that of the above-mentioned N-methylpyrrolidone, and also discloses that a liquid crystal polyester-impregnated base material can be easily produced by impregnating a base material such as an inorganic fiber or an organic fiber with a liquid composition containing a liquid crystal polyester, and then removing a solvent.

However, a conventional liquid composition containing a liquid crystal polyester left some room for further improvement with respect to stability of a viscosity and stability of a solubility during storage. In relation to the stability, the liquid composition containing a liquid crystal polyester, which contains a liquid crystal polyester and N-methylpyrrolidone, specifically disclosed in Examples of JP-A-2007-146139 (corresponding to CN1955253A and KR2007045095A) has such a problem that the liquid crystal polyester is precipitated, resulting in sedimentation as for stability of the solubility during storage at normal temperature, although the stability of the viscosity during storage is stable since it is hard to increase.

There has been known, as the method for the prevention of sedimentation of a resin in a liquid composition containing a resin, a method in which a sedimentation inhibitor is added to a liquid composition. For example, JP-A-60-231775 discloses that sedimentation of an unsaturated polyester can be suppressed by adding a sedimentation inhibitor to a mixture of an unsaturated polyester varnish and a white pigment. JP-A-7-266499 discloses that sedimentation of a thermosetting resin can be suppressed by adding fumed silica as a sedimentation inhibitor to a varnish containing a thermosetting resin and an inorganic filler, and thus producing a copper clad laminate in which inorganic fillers are uniformly distributed in a thickness direction.

However, an aspect of use of a sedimentation inhibitor for a liquid composition containing a resin had a problem that additional step for dispersing a sedimentation inhibitor in a liquid composition is required, and thus production costs of the liquid composition increase. There was also a problem that, even in case of performing dissolution of a resin in a solvent and dispersion of a sedimentation inhibitor in the solvent in one single step, filtration resistance increases in the filtration step for removing foreign substances in a liquid composition containing a resin and a sedimentation inhibitor, and thus it becomes hard to produce a liquid composition.

SUMMARY OF THE INVENTION

In light of the above-mentioned circumstances, the present invention has been made and an object thereof is to provide a liquid composition containing a liquid crystal polyester, which contains a liquid crystal polyester and a solvent, and also exhibits stable viscosity and solubility during storage at normal temperature without using a sedimentation inhibitor.

To solve the problems, the present invention provides a liquid composition containing a liquid crystal polyester, comprising;
  15 to 40% by weight of a liquid crystal polyester; and
  60 to 85% by weight of a solvent containing N-methylpyrrolidone;
wherein the liquid composition has a viscosity of 1.5 Pa·s or larger measured at 23° C., and the total of the liquid crystal polyester and the solvent is 100% by weight.

According to the present invention, it is possible to provide a liquid composition containing a liquid crystal polyester, which contains a liquid crystal polyester and a solvent, and also exhibits stable viscosity and solubility during storage at normal temperature without using a sedimentation inhibitor.

DETAILED DESCRIPTION OF THE INVENTION

The liquid composition containing a liquid crystal polyester of the present invention (hereinafter referred to as a "liquid composition") is a liquid composition in which the content of a liquid crystal polyester is high, and also (1) a change in viscosity and (2) precipitation and sedimentation of a liquid crystal polyester during storage at normal temperature are suppressed.

The liquid crystal polyester according to the present invention is preferably a liquid crystal polyester which exhibits mesomorphism in a molten state, and is melted at a temperature of 450° C. or lower. The liquid crystal polyester is a liquid Crystal polyester amide, a liquid crystal polyester ether, a liquid crystal polyester carbonate, or a liquid crystal polyester imide. The liquid crystal polyester is preferably a whole aromatic liquid crystal polyester in which only an aromatic compound is used as a raw monomer.

Typical examples of the liquid crystal polyester include (I) a liquid crystal polyester obtained by polymerizing (polycondensing) an aromatic hydroxycarboxylic acid, an aromatic dicarboxylic acid, and at least one kind of a compound selected from the group consisting of an aromatic diol, an aromatic hydroxyamine and an aromatic diamine; (II) a liquid crystal polyester obtained by polymerizing plural kinds of aromatic hydroxycarboxylic acids; (III) a liquid crystal polyester obtained by polymerizing an aromatic dicarboxylic acid with at least one kind of a compound selected from the group consisting of an aromatic diol, an aromatic hydroxyamine and an aromatic diamine; and (IV) a liquid crystal polyester obtained by polymerizing a polyester such as polyethylene terephthalate with an aromatic hydroxycarboxylic acid. Herein, a part or all of a polymerizable derivative of an aromatic hydroxycarboxylic acid, an aromatic dicarboxylic acid, an aromatic diol, an aromatic hydroxyamine and an aromatic diamine may be changed, respectively independently, to a polymerizable derivative thereof.

Examples of the polymerizable derivative of the compound having a carboxyl group, such as an aromatic hydroxycarboxylic acid and an aromatic dicarboxylic acid include a derivative (ester) in which a carboxyl group is converted into an alkoxycarbonyl group or an aryloxycarbonyl group; a derivative (acid halide) in which a carboxyl group is converted into a haloformyl group, and a derivative (acid anhydride) in which a carboxyl group is converted into an acyloxycarbonyl group.

Examples of the polymerizable derivative of the compound having a hydroxyl group, such as an aromatic hydroxycarboxylic acid, an aromatic diol and an aromatic hydroxylamine include a derivative (acylate) in which a hydroxyl group is converted into an acyloxyl group by acylation.

Examples of the polymerizable derivative of the compound having an amino group, such as an aromatic hydroxyamine and an aromatic diamine include a derivative (acylate) in which an amino group is converted into an acylamino group by acylation.

The liquid crystal polyester preferably includes a repeating unit represented by the following general formula (1) (hereinafter referred to as a "repeating unit (1)"), and more preferably includes a repeating unit (1), a repeating unit represented by the following general formula (2) (hereinafter referred to as a "repeating unit (2)"), and a repeating unit represented by the following general formula (3) (hereinafter referred to as a "repeating unit (3)"):

—O—Ar¹—CO—,    (1)

—CO—Ar²—CO—,    (2)

—X—Ar³—Y—, and    (3)

—Ar⁴—Z—Ar⁵—    (4)

wherein $Ar^1$ is a phenylene group, a naphthylene group or a biphenylylene group; $Ar^2$ and $Ar^3$ each independently represents a phenylene group, a naphthylene group, a biphenylylene group, or a group represented by the general formula (4); X and Y each independently represents an oxygen atom or an imino group; $Ar^4$ and $Ar^5$ each independently represents a phenylene group or a naphthylene group; Z is an oxygen atom, a sulfur atom, a carbonyl group, a sulfonyl group or an alkylidene group; and hydrogen atoms in $Ar^1$, $Ar^2$ or $Ar^3$ each independently may be substituted with a halogen atom, an alkyl group or an aryl group.

Examples of the halogen atom include a fluorine atom, a chlorine atom, a bromine atom and an iodine atom. Examples of the alkyl group include a methyl group, an ethyl group, an n-propyl group, an isopropyl group, an n-butyl group, an isobutyl group, a sec-butyl group, a tert-butyl group, an n-pentyl group, an n-hexyl group, an n-heptyl group, a 2-ethylhexyl group, an n-octyl group, an n-nonyl group and n-decyl group, and the number of carbon atoms is preferably from 1 to 10. Examples of the aryl group include a phenyl group, an o-tolyl group, an m-tolyl group, a p-tolyl group, a 1-naphthyl group and a 2-naphthyl group, and the number of carbon atoms is preferably from 6 to 20.

When the hydrogen atom is substituted with these groups, the number thereof is preferably 2 or less, and more preferably 1, every group represented by $Ar^1$, $Ar^2$ or $Ar^3$, respectively, independently.

Examples of the alkylidene group include a methylene group, an ethylidene group, an isopropylidene group, an n-butylidene group and a 2-ethylhexylidene group, and the number of carbon atoms is preferably from 1 to 10.

The repeating unit (1) is a repeating unit derived from an aromatic hydroxycarboxylic acid. The repeating unit (1) is preferably a repeating unit derived from p-hydroxybenzoic acid ($Ar^1$ is a p-phenylene group), or a repeating unit derived from 6-hydroxy-2-naphthoic acid ($Ar^1$ is a 2,6-naphthylene group).

The repeating unit (2) is a repeating unit derived from an aromatic dicarboxylic acid. The repeating unit (2) is preferably a repeating unit derived from terephthalic acid ($Ar^2$ is a p-phenylene group), a repeating unit derived from isophthalic acid ($Ar^2$ is a m-phenylene group), a repeating unit derived from 2,6-naphthalenedicarboxylic acid ($Ar^2$ is a 2,6-naphthylene group), or a repeating unit derived from diphenylether-4,4'-dicarboxylic acid ($Ar^2$ is a diphenylether-4,4'-diyl group).

The repeating unit (3) is a repeating unit derived from an aromatic diol, an aromatic hydroxylamine or an aromatic diamine. The repeating unit (3) is preferably a repeating unit derived from hydroquinone, p-aminophenol or p-phenylenediamine ($Ar^3$ is a p-phenylene group), or a repeating unit derived from 4,4'-dihydroxybiphenyl, 4-amino-4'-hydroxybiphenyl or 4,4'-diaminobiphenyl ($Ar^3$ is a 4,4'-biphenylylene group).

The content of the repeating unit (1) is preferably 30 units or more, more preferably 30 to 80 units, still more preferably 30 to 60 unit, and particularly preferably 30 to 45 units, based on the total (100 units) of repeating units (1), (2) and (3) included in the liquid crystal polyester. The content of the repeating unit (2) is preferably 35 units or less, more preferably from 10 to 35 units, still more preferably from 20 to 35 units, and particularly preferably from 27.5 to 35 units. The content of the repeating unit (3) is preferably 35 units or less, more preferably from 10 to 35 units, still more preferably from 20 to 35 units, and particularly preferably from 27.5 to 35 units. As the content of the repeating unit (1) increases, heat resistance as well as strength and rigidity are likely to be improved. However, when the content is too large, solubility in a solvent is likely to decrease.

A ratio of the content of the repeating unit (2) to the content of the repeating unit (3) [content of the repeating unit (2)]/[content of the repeating unit (3)] is preferably from 0.9/1 to 1/0.9, more preferably from 0.95/1 to 1/0.95, and still more preferably from 0.98/1 to 1/0.98.

The liquid crystal polyester may include two or more kinds of repeating units (1) to (3), respectively independently. The liquid crystal polyester may include repeating units other than repeating units (1) to (3), and the content thereof is preferably 10 units or less, and more preferably 5 units or less, based on 100 units as the total of the whole repeating unit contained the liquid crystal polyester.

From the viewpoint of a liquid crystal polyester having excellent solubility in a solvent, the liquid crystal polyester preferably includes, as the repeating unit (3), a repeating unit in which one of X and Y is an imino group (—NH—) and the other one is an oxygen atom, that is, a repeating unit derived from an aromatic hydroxyamine, and more preferably includes, as the repeating unit (3), only a repeating unit in which one of X and Y is an imino group and the other one is an oxygen atom.

From the viewpoint of producing a high molecular weight liquid crystal polyester having high heat resistance as well as strength and rigidity with satisfactory operability, the liquid crystal polyester is preferably produced by a production method including (1) the step of melt-polymerizing a raw compound (monomer) to obtain a polymer (prepolymer) and (2) the step of subjecting the obtained prepolymer to solid phase polymerization.

The melt polymerization may be performed in the presence of a catalyst, and examples of the catalyst include metal compounds such as magnesium acetate, stannous acetate, tetrabutyl titanate, lead acetate, sodium acetate, potassium acetate and antimony trioxide; and nitrogen-containing heterocyclic compounds such as 4-(dimethylamino)pyridine and 1-methylimidazole. Among these catalysts, nitrogen-containing heterocyclic compounds are preferable.

The flow initiation temperature of the liquid crystal polyester is preferably 250° C. or higher, more preferably from 250° C. to 350° C., and still more preferably from 260° C. to 330° C. As the flow initiation temperature increases, heat resistance as well as strength and rigidity are likely to be improved. When the flow initiation temperature is too high, solubility in a solvent is likely to decrease, or the viscosity of the liquid composition is likely to increases.

The flow initiation temperature is also called a flow temperature and means a temperature at which a melt viscosity becomes 4,800 Pa·s (48,000 poise) when a liquid crystal polyester is melted while heating at a heating rate of 4° C./min under a load of 9.8 MPa (100 kg/cm$^2$) and extruded through a nozzle having an inner diameter of 1 mm and a length of 10 mm using a capillary rheometer, and the flow initiation temperature serves as an index indicating a molecular weight of the liquid crystal polyester (see "Liquid Crystalline Polymer Synthesis, Molding, and Application" edited by Naoyuki Koide, page 95, published by CMC Publishing Co., Ltd. on Jun. 5, 1987).

The solvent according to the present invention, that is, "solvent containing N-methylpyrrolidone" contained in the liquid composition of the present invention may be only N-methylpyrrolidone, or may be a combination of N-methylpyrrolidone and the other solvent. The content of the solvent according to the present invention in the liquid composition is from 60 to 85% by weight, preferably from 65 to 85% by weight, and more preferably from 65 to 80% by weight, based on the total (100% by weight) of the liquid crystal polyester and the solvent. It is possible to use, as the abovementioned other solvent, a solvent in which the liquid crystal polyester is soluble, specifically a solvent which is soluble in the concentration ([amount of liquid crystal polyester]×100/[amount of liquid crystal polyester+amount of whole solvent]) of 1% by weight or more at 50° C.

Examples of the other solvent include halogenated hydrocarbons such as dichloromethane, chloroform, 1,2-dichloroethane, 1,1,2,2-tetrachloroethane and o-dichlorobenzene; halogenated phenols such as p-chlorophenol, pentachlorophenol and pentafluorophenol; ethers such as diethylether, tetrahydrofuran and 1,4-dioxane; ketones such as acetone and cyclohexanone; esters such as ethyl acetate and γ-butyrolactone; carbonates such as ethylene carbonate and propylene carbonate; amines such as triethylamine; nitrogen-containing heterocyclic aromatic compounds such as pyridine; nitriles such as acetonitrile and succinonitrile; amide-based compounds (compounds having an amide bond) such as N,N-dimethylformamide and N,N-dimethylacetamide; urea compounds such as tetramethylurea; nitro compounds such as nitromethane and nitrobenzene; sulfur compounds such as dimethyl sulfoxide and sulfolane; phosphorus compounds such as hexamethylphosphoric acid amide and tri-n-butylphosphoric acid; and combinations of two or more these solvents.

From the viewpoint of low corrosion resistance and ease of handling, the solvent according to the present invention is preferably a solvent containing, as a main component, an aprotic compound, and particularly an aprotic compound having no halogen atom. The proportion of the aprotic compound is preferably from 50 to 100% by weight, more preferably from 70 to 100% by weight, and still preferably from 90 to 100% by weight, based on the whole amount (100% by weight) of the solvent. From the viewpoint of ease of dissolving the liquid crystal polyester, the aprotic compound other than N-methylpyrrolidone may be preferably amide-based compounds such as N,N-dimethylformamide and N,N-dimethylacetamide.

From the viewpoint of ease of dissolving the liquid crystal polyester, the solvent according to the present invention is preferably a solvent containing, as a main component, a compound having a dipole moment of 3 to 5. The proportion of the compound having a dipole moment of 3 to 5 is preferably from 50 to 100% by weight, more preferably from 70 to 100% by weight, and still more preferably from 90 to 100% by weight, based on the whole amount (100% by weight) of the solvent. Therefore, the aprotic compound is preferably a compound having a dipole moment of 3 to 5.

From the viewpoint of ease of removing the solvent in an aspect of impregnating a base material with a liquid composition and then removing the solvent, the solvent according to the present invention is preferably, for example, a solvent containing, as a main component, a compound having a boiling point of 220° C. or lower at 1 atm. The proportion of the compound having a boiling point of 220° C. or lower at 1 atm is preferably from 50 to 100% by weight, more preferably from 70 to 100% by weight, and still preferably from 90 to 100% by weight, based on the whole amount (100% by weight) of the solvent. Therefore, the aprotic compound is preferably compound having a boiling point of 220° C. or lower at 1 atm.

The content of the liquid crystal polyester in the liquid composition is 15 to 40% by weight, preferably from 15 to 35% by weight, and more preferably from 20 to 35% by weight, based on the total (100% by weight) of the liquid crystal polyester and the solvent. The content of the liquid crystal polyester is appropriately adjusted so as to obtain a liquid composition having a desired viscosity.

The viscosity measured at 23° C. of the liquid composition is 1.5 Pa·s (1,500 cP (centipoises)) or larger, preferably from 1.5 to 20.0 Pa·s, and more preferably from 1.5 to 10.0 Pa·s. When the viscosity is 1.5 Pa·s or larger, in case of storing the liquid composition at normal temperature (for example, 23° C.), precipitation and sedimentation of a liquid crystal polyester are suppressed, and thus the content of the liquid crystal polyester in the liquid composition is stabilized. When the viscosity is 20.0 Pa·s or smaller, for example, in the step of filtering the liquid composition for the purpose of removing foreign substances, filtration resistance decreases, and thus it becomes more easy to perform filtration.

The viscosity at 23° C. of the liquid composition of the present invention is 1.5 Pa·s or larger even in case of storing at normal temperature until the moment when comparatively long period have elapsed from the moment immediately after the production. Preferably, the viscosity at 23° C. satisfies the above-mentioned numerical range even in case of storing at normal temperature for 3 months from the moment immediately after the production. The above-mentioned "normal temperature" means a temperature of about 18 to 28° C., and it is possible to exemplify, as typical normal temperature, 23° C.

The viscosity at each temperature including 23° C. of the liquid composition can be appropriately controlled, for example, by adjusting the flow initiation temperature of the liquid crystal polyester and the content of the liquid crystal polyester in the liquid composition.

The liquid composition may contain one or more kinds of other components, such as a filler, an additive, and a resin other than the liquid crystal polyester.

Examples of the filler include inorganic fillers such as silica, alumina, titanium oxide, barium titanate, strontium titanate, aluminum hydroxide and calcium carbonate; and organic fillers such as a cured epoxy resin, a cross-linked benzoguanamine resin and a cross-linked acrylic resin. The content of the filler is preferably from 0 to 100 parts by weight based on 100 parts by weight of the liquid crystal polyester.

Examples of the additive include a leveling agent, a defoamer, an antioxidant, an ultraviolet absorber, a flame retardant and a colorant. The content of the additive is preferably from 0 to 5 parts by weight based on 100 parts by weight of the liquid crystal polyester.

Examples of the resin other than the liquid crystal polyester include thermoplastic resins such as polypropylene, polyamide, polyester other than the liquid crystal polyester, polyphenylene sulfide, polyetherketone, polycarbonate, polyethersulfone, polyphenyleneether and polyetherimide; and thermosetting resins such as a phenol resin, an epoxy resin, a polyimide resin and a cyanate resin. The content of the resin other than the liquid crystal polyester is preferably from 0 to 20 parts by weight based on 100 parts by weight of the liquid crystal polyester.

The liquid composition of the present invention can be produced by mixing a liquid crystal polyester with a solvent, collectively or in an appropriate order. When the other component is further added to the liquid composition, the liquid composition may be similarly mixed with the other component, collectively or in an appropriate order. When the other component is a filler, the filler may be dispersed in the liquid composition. When the other component is added to the liquid composition, the solvent may be further added. It is possible to exemplify, as the solvent, solvents which are the same as the above-mentioned solvents.

The liquid composition of the present invention can be used in various applications. For example, a liquid crystal polyester-impregnated base material can be produced by impregnating a base material such as an inorganic fiber or an organic fiber with a liquid composition, and then removing a solvent from the impregnated base material. This liquid crystal polyester-impregnated base material is suited for use as an insulating material such as an electronic substrate.

When the liquid composition of the resin is stored at normal temperature, a change in viscosity, especially an increase in viscosity is usually observed. However, when the liquid composition of the present invention is stored at normal temperature, a change in viscosity is suppressed. Furthermore, when the liquid composition of the present invention is stored at normal temperature, a change in concentration is suppressed even in case of a liquid composition having high concentration. Therefore, liquid composition having high concentration is suited to produce a liquid crystal polyester-impregnated base material having excellent quality, simply at low costs, without using a sedimentation inhibitor.

EXAMPLES

The present invention will be described below by way of Examples, but the present invention is not limited to these Examples. The flow initiation temperature of the liquid crystal polyester as well as the viscosity and difference in solid content of the liquid composition were respectively measured in accordance with the following methods.

1. Flow Initiation Temperature of Liquid Crystal Polyester

Using a flow tester (Model CFT-500, manufactured by Shimadzu Corporation), a flow initiation temperature was measured by the following procedure. That is, about 2 g of a liquid crystal polyester was filled in a cylinder with a die including a nozzle having an inner diameter 1 mm and a length of 10 mm attached thereto, and the liquid crystal polyester was extruded through the nozzle while melting at a rate of 4° C./minute under a load of 9.8 MPa (100 kgf/cm$^2$), and then the temperature at which the liquid crystal polyester shows a viscosity of 4,800 Pa·s (48,000 poise) was measured. This temperature was regarded as a flow initiation temperature.

2. Viscosity of Liquid Composition

Using a B type viscometer, Model TVL-20, manufactured by TOKI SANGYO Co., Ltd., a viscosity of a liquid composition was measured by a No. 21 rotor at a rotation speed of 20 rpm.

3. Difference in Solid Content of Liquid Composition

A difference in solid content of a liquid composition was measured by the method including the following processes of:

(1) filling about 100 g of a liquid composition into a 100 ml glass bottle called a glass vial;

(2) collecting a sample of the portion located at about 1 cm below a liquid level of the liquid composition immediately after filling, weighing about 3 g of the sample in an aluminum cup having a diameter of 10 cm, and designating the amount of the weighed sample as "weight W1.1 before drying";

(3) collecting a sample of the portion located at about 1 cm below a liquid level of the liquid composition at the moment after having been left to stand for 3 months since completion of the filling, weighing about 3 g of the sample in an aluminum cup having a diameter of 10 cm, and designating the amount of the weighed sample as "weight W2.1 before drying";

(4) drying the aluminum cup containing the sample of the above (2) and the aluminum cup containing the sample of the above (3) in an oven at 220° C. for 3 hours;

(5) weighing the amounts of the respective samples after drying, and designating the amounts as "weight W1.2 after drying" and "weight W2.2 after drying", respectively;

(6) designating a difference ["weight W1.1 before drying"–"weight W1.2 after drying"] as "solid content (immediately after filling", and designating a difference ["weight W2.1 before drying" "weight W2.2 after drying"] as "solid content (after being left to stand for 3 months)"; and (7) calculating a difference in solid content based on the following equation.

$$\text{Difference in solid content}(\% \text{ by weight}) = [\text{solid content(after being left to stand for 3 months)} - \text{solid content(immediately after filling)}] \times 100 / \text{solid content (immediately after filling)}$$

Production Example 1

Production of Liquid Crystal Polyester-1

In a reactor equipped with a stirrer, a torque meter, a nitrogen introducing tube, a thermometer and a reflux condenser, 1,976 g (10.5 mol) of 6-hydroxy-2-naphthoic acid, 1,474 g (9.75 mol) of 4-hydroxyacetoanilide, 1,620 g (9.75 mol) of isophthalic acid and 2,374 g (23.25 mol) of acetic anhydride were charged and a gas in the reactor was replaced by a nitrogen gas. Then, the temperature was raised from room temperature to 150° C. over 15 minutes while stirring under a nitrogen gas flow, and the mixture was refluxed at 150° C. for 3 hours.

Then, the temperature was raised to 300° C. over 2 hours and 50 minutes while distilling off acetic acid and unreacted acetic anhydride as by-products. After maintaining at 300° C. for 1 hour, contents were removed from the reactor. The contents were cooled to room temperature and the obtained solid substance was ground by a grinder to obtain a powdered liquid crystal polyester (prepolymer). This prepolymer showed a flow initiation temperature of 235° C.

This prepolymer was subjected to solid phase polymerization by raising the temperature from room temperature to 220° C. over 7 hours and 40 minutes under a nitrogen atmosphere and maintaining at 220° C. for 5 hours. The solid phase polymer was cooled to obtain a powdered liquid crystal polyester-1. The liquid crystal polyester-1 showed a flow initiation temperature of 277° C.

Production Example 2

Production of Liquid Crystal Polyester-2

The prepolymer obtained in the same manner as in Production Example 1 was subjected to solid phase polymerization by raising the temperature from room temperature to 240° C. over 11 hours under a nitrogen atmosphere and maintaining at 240° C. for 5 hours. The solid phase polymer was cooled to obtain a powdered liquid crystal polyester-2. The liquid crystal polyester-2 showed a flow initiation temperature of 308° C.

Production Example 3

Production of Liquid Crystal Polyester-3

The prepolymer obtained in the same manner as in Production Example 1 was subjected to solid phase polymerization by raising the temperature from room temperature to 200° C. over 4 hours and 20 minutes under a nitrogen atmosphere and maintaining at 200° C. for 5 hours. The solid phase polymer was cooled to obtain a powdered liquid crystal polyester-3. The liquid crystal polyester-3 showed a flow initiation temperature of 264° C.

Example 1

After adding 81 g of the liquid crystal polyester-1 obtained in Production Example 1 to 219 g of N-methylpyrrolidone, the mixture was stirred at 100° C. for 2 hours to obtain a solution-like liquid composition. With respect to this liquid composition, (1) a viscosity (initial viscosity) was measured to obtain 1.604 Pa·s, and (2) the solid content (immediately after filling) was measured.

After this liquid composition was left to stand at 23° C. for 3 months, (1) a viscosity (a viscosity after being left to stand for 3 months) was measured to obtain 3.350 Pa·s, and (2) the solid content (after being left to stand for 3 months) was measured, and then a difference in solid content was calculated to obtain 0%, and thus visually confirming that (3) sedimentation does not occur. The results are summarized in Table 1.

Example 2

In the same manner as in Example 1, except that the amount (81 g) of the liquid crystal polyester-1 was changed to 90 g, and that the amount (219 g) of N-methylpyrrolidone was changed to 210 g, a solution-like liquid composition was obtained. With respect to this liquid composition, (1) a viscosity (initial viscosity) was measured to obtain 3.350 Pa·s, and (2) the solid content (immediately after filling) was measured.

After this liquid composition was left to stand at 23° C. for 3 months, (1) a viscosity (a viscosity after being left to stand for 3 months) was measured to obtain 5.930 Pa·s, and (2) solid content (after being left to stand for months) was measured, and then a difference in solid content was calculated to obtain 0%, and thus visually confirming that (3) sedimentation does not occur. The results are summarized in Table 1.

Example 3

In the same manner as in Example 1, except that the amount (81 g) of the liquid crystal polyester-1 obtained in Production Example 1 was changed to 48 g of the liquid crystal polyester-2 obtained in Production Example 2, and that the amount (219 g) of N-methylpyrrolidone was changed to 252 g, a solution-like liquid composition was obtained. With respect to this liquid composition, (1) a viscosity (initial viscosity) was measured to obtain 1.550 Pa·s, and (2) the solid content (immediately after filling) was measured.

After this liquid composition was left to stand at 23° C. for 3 months, (1) a viscosity (a viscosity after being left to stand for 3 months) was measured to obtain 4.530 Pa·s, and (2) the solid content (after being left to stand for 3 months) was measured, and then a difference in solid content was measured to obtain 0%, and thus visually confirming that (3) sedimentation does not occur. The results are summarized in Table 1.

Comparative Example 1

In the same manner as in Example 1, except that the amount (81 g) of the liquid crystal polyester-1 was changed to 66 g, and that the amount (219 g) of N-methylpyrrolidone was changed to 234 g, a solution-like liquid composition was obtained. With respect to this liquid composition, (1) a viscosity (initial viscosity) was measured to obtain 0.414 Pa·s, and (2) the solid content (immediately after filling) was measured.

After this liquid composition was left to stand at 23° C. for 3 months, (1) a viscosity (a viscosity after being left to stand for 3 months) was measured to obtain 0.396 Pa·s, and (2) solid content (after being left to stand for 3 months) was measured, and then a difference in solid content was calculated to obtain −0.9% by weight, and thus visually confirming that (3) sedimentation occurs. The results are summarized in Table 1.

Comparative Example 2

In the same manner as in Example 1, except that the amount (81 g) of the liquid crystal polyester-1 was changed to 75 g, and that the amount (219 g) of N-methylpyrrolidone was changed to 225 g, a solution-like liquid composition was obtained. With respect to this liquid composition, (1) a viscosity (initial viscosity) was measured to obtain 0.928 Pa·s, and (2) the solid content (immediately after filling) was measured.

After this liquid composition was left to stand at 23° C. for 3 months, (1) a viscosity (a viscosity after being left to stand for 3 months) was measured to obtain 0.875 Pa·s, and (2) solid content (after being left to stand for 3 months) was measured, and then a difference in solid content was calculated to obtain −0.5% by weight, and thus visually confirming that (3) sedimentation occurs. The results are summarized in Table 1.

Comparative Example 3

In the same manner as in Example 1, except that the amount (81 g) of the liquid crystal polyester-1 obtained in Production Example 1 was changed to 81 g of the liquid crystal polyester-3 obtained in Production Example 3, a solution-like liquid composition was obtained. With respect to this liquid composition, (1) a viscosity (initial viscosity) was measured to obtain 0.722 Pa·s, and (2) the solid content (immediately after filling) was measured.

After this liquid composition was left to stand at 23° C. for 3 months, (1) a viscosity (a viscosity after being left to stand for 3 months) was measured to obtain 0.692 Pa·s, and (2) the solid content (after being left to stand for 3 months) was measured, and then a difference in solid content was measured to obtain −0.7% by weight, and thus visually confirming that (3) sedimentation occurs. The results are summarized in Table 1.

liquid compositions containing a liquid crystal polyester with low initial viscosity (Comparative Examples 1 to 3).

The liquid composition containing a liquid crystal polyester of the present invention can be suitably used as an insulating material such as an electronic substrate.

What is claimed is:

1. A liquid composition containing a liquid crystal polyester, comprising:
   (a) 15 to 40% by weight of a liquid crystal polyester including a repeating unit represented by the general formula (1), a repeating unit represented by the general formula (2), and a repeating unit represented by the general formula (3):

$$-O-Ar^1-CO-, \quad (1)$$

$$-CO-Ar^2-CO-, \quad (2)$$

$$-X-Ar^3-Y-, \text{ and} \quad (3)$$

$$-Ar^4-Z-Ar^5- \quad (4)$$

wherein $Ar^1$ is a phenylene group, a naphthylene group, or a biphenylylene group; $Ar^2$ and $Ar^3$ each independently represents a phenylene group, a naphthylene group, a biphenylylene group, or a group represented by the general formula (4); X and Y each independently represents an oxygen atom or an imino group; $Ar^4$ and $Ar^5$ each independently represents a phenylene group or a naphthylene group; Z is an oxygen atom, a sulfur atom, a carbonyl group, a sulfonyl group, or an alkylidene group; and hydrogen atoms in $Ar^1$, $Ar^2$, or $Ar^3$ each independently can be substituted with a halogen atom, an alkyl group, or an aryl group; and

TABLE 1

|  | Example | | | Comparative Example | | |
|---|---|---|---|---|---|---|
|  | 1 | 2 | 3 | 1 | 2 | 3 |
| 1. Liquid crystal polyester | | | | | | |
| (1) Liquid crystal polyester-1 | | | | | | |
| Use amount (g) | 81 | 90 | | 66 | 75 | |
| Use proportion (% by weight) | 27 | 30 | | 22 | 25 | |
| (2) Liquid crystal polyester-2 | | | | | | |
| Use amount (g) | | | 48 | | | |
| Use proportion (% by weight) | | | 16 | | | |
| (3) Liquid crystal polyester-3 | | | | | | |
| Use amount (g) | | | | | | 81 |
| Use proportion (% by weight) | | | | | | 27 |
| 2. Solvent (N-methylpyrrolidone) | | | | | | |
| Use amount (g) | 219 | 210 | 252 | 234 | 225 | 219 |
| Use proportion (% by weight) | 73 | 70 | 84 | 78 | 75 | 73 |
| Liquid composition | | | | | | |
| (1) Initial viscosity | 1.604 | 3.350 | 1.550 | 0.414 | 0.928 | 0.722 |
| (2) Viscosity after being left to stand for 3 months | 3.350 | 5.930 | 4.530 | 0.396 | 0.876 | 0.692 |
| 2. Difference in solid content (% by weight) | 0 | 0 | 0 | −0.9 | −0.5 | −0.7 |
| 3. Presence or absence of sedimentation | not observed | not observed | not observed | observed | observed | observed |

It was clearly confirmed that, even if the liquid composition containing a liquid crystal polyester of the present invention was stored (left to stand) at 23° C. for 3 months without using a sedimentation inhibitor, based on Table 1, (1) a change in viscosity is suppressed and (2) a change in solid content is not recognized, and also (3) sedimentation is recognized. In contrast, A change in viscosity was suppressed, and also a change in solid content and sedimentation were recognized in the (b) 60 to 85% by weight of a solvent containing N-methylpyrrolidone;
wherein the liquid composition has a viscosity of 1.5 Pa·s or larger measured at 23° C. and the total of the liquid crystal polyester and the solvent is 100% by weight.

2. The liquid composition containing a liquid crystal polyester according to claim 1, wherein the liquid crystal polyester is a liquid crystal polyester including 30 to 45 units of a repeating unit represented by the general formula (1), 27.5 to 35 units of a repeating unit represented by the general formula (2), and 27.5 to 35 units of a repeating unit represented by the general formula (3), based on the total (100 units) of repeating units represented by the general formulas (1), (2), and (3).

3. The liquid composition containing a liquid crystal polyester according to claim 2, wherein one of X and Y in the general formula (3) is an imino group, and the other one is an oxygen atom.

4. The liquid composition containing a liquid crystal polyester according to claim 2, wherein $Ar^1$ in the general formula (1) is a p-phenylene group or a 2,6-naphthylene group.

* * * * *